(12) United States Patent
Ito

(10) Patent No.: US 7,476,071 B2
(45) Date of Patent: Jan. 13, 2009

(54) VEHICLE EQUIPPED WITH LIFT DEVICE AND LIFT DEVICE

(75) Inventor: Hideaki Ito, Maebashi (JP)

(73) Assignee: Sato Kogyosyo Co., Ltd., Gunma (JP)

( * ) Notice: Subject to any disclaimer, the term of this patent is extended or adjusted under 35 U.S.C. 154(b) by 287 days.

(21) Appl. No.: 11/528,963

(22) Filed: Sep. 27, 2006

(65) Prior Publication Data

US 2007/0207018 A1    Sep. 6, 2007

(51) Int. Cl.
*B62D 43/00* (2006.01)

(52) U.S. Cl. .................... 414/466; 414/469; 414/917

(58) Field of Classification Search .............. 414/546, 414/462, 465, 466, 469, 917, 680; 296/3; 224/309, 310; 212/180; 74/469
See application file for complete search history.

(56) References Cited

U.S. PATENT DOCUMENTS

| | | | | |
|---|---|---|---|---|
| 4,260,314 | A * | 4/1981 | Golze | 414/462 |
| 5,104,280 | A * | 4/1992 | Ziaylek et al. | 414/462 |
| 6,092,972 | A * | 7/2000 | Levi | 414/462 |
| 6,105,909 | A * | 8/2000 | Wirth et al. | 248/123.2 |
| 6,234,741 | B1 * | 5/2001 | McDaniel | 414/546 |
| 7,077,617 | B2 * | 7/2006 | Itoh | 414/680 |
| 7,232,285 | B1 * | 6/2007 | Ruch | 414/542 |
| 7,341,418 | B2 * | 3/2008 | Ito | 414/466 |
| 2002/0090285 | A1 * | 7/2002 | Levi | 414/462 |
| 2003/0175101 | A1 * | 9/2003 | Levi | 414/462 |
| 2006/0182583 | A1 * | 8/2006 | Janecek | 414/546 |
| 2006/0280583 | A1 * | 12/2006 | Settelmayer et al. | 414/462 |
| 2007/0183875 | A1 * | 8/2007 | Thibault | 414/462 |

* cited by examiner

*Primary Examiner*—Saúl J Rodríguez
*Assistant Examiner*—Joshua I Rudawitz
(74) *Attorney, Agent, or Firm*—Townsend & Banta

(57) ABSTRACT

A vehicle equipped with a lift device, capable of suitably lowering objects that have been placed in a high place to a position at which they can be reached by people, is provided. A link unit is provided on the top of the vehicle. The link unit is comprised of telescoping arms, which are parallel to each other. The link unit is comprised of base arm members, slide arm members, a base link which connects the base arm members, and support links, which are parallel to the base links and which connect the slide arm members. Further, the link unit is comprised of a drive boom, which is swung up and down on the top of the vehicle around a drive shaft, and a follow boom, which is swung, in the same direction as the drive boom, around a support shaft that is parallel to the drive shaft. One base arm member is attached to the leading end of the drive boom, and another base arm member is attached to the leading end of the follow boom.

11 Claims, 5 Drawing Sheets

VEHICLE EQUIPPED WITH LIFT DEVICE AND LIFT DEVICE

FIELD OF THE INVENTION

The present invention relates to a lift device that can quickly and easily raise and lower an object that is disposed on a high surface. More specifically, it relates to a lift device and to a vehicle equipped with a lift device that is optimal for use in loading and unloading large loads onto the tops of vehicles.

BACKGROUND OF THE INVENTION

High surfaces, which represent dead space, are commonly advantageously used for storage of objects of various different types. For example, rescue ladders and folding boats are often loaded on the top of firefighting vehicles and used to rescue people.

However, each time that objects are loaded onto or taken down from these high surfaces, it is necessary to go up to this high surface and pass the objects up and down, which is bothersome and may be dangerous.

In particular, when rescue ladders and boats are loaded on the top of a vehicle body, there is a problem in that they cannot be quickly unloaded, even if there is urgent need for their use.

Note that, lift devices can also be used for loading and unloading objects, but conventional lift devices generally use hydraulic systems or the like to move loading platforms straight up and down. With such conventional lift devices, it is necessary for a person to move the objects between the loading platform and the high surface. Furthermore, crane systems are capable only of reducing human labor, and cannot be expected to greatly reduce the time required for loading and unloading; nor are these systems suitable for firefighting and the like, where speed is vital.

Lift devices have been developed and put into practical use, wherein a long carrier on which various objects are loaded is lowered at an inclination from a high surface, such as the top of a vehicle, by swinging a swing arm up and down (for example, see JP-3380199-B and JP-2004-182363-A).

However, while the lift device described in JP-3380199-B is advantageous in that it can be applied to firefighting vehicles and rescue ladders and the like, in that it can easily and rapidly be loaded and unloaded without a person having to go up to the top of the vehicle to do so, in cases where, in order to accommodate a long load or the like, the carrier has to be long, there must be a corresponding increase in the designed length of the swing arm (which corresponds to the drive boom in the present invention). This presents a problem in that the swing radius of the swing arm increases so that, when working in an enclosed space having a low ceiling or beneath overhead wires, the swing arm or the top of the carrier may collide with obstacles such as ceilings or overhead wires when the swing arm is swung.

With respect to this problem, in JP-2004-182363-A, problems such as those described above are solved by a constitution wherein the swing arm telescopes during the swing so that the length thereof is reduced when in the upright posture. But, the center of swing of the swing arm is on the top of the vehicle, and the swing arm only swings up and down on the top of the vehicle, so that even if the length of the swing arm is increased, if the carrier is short, it is not possible for that carrier to hold long objects. Further, if the vehicle is high, with respect to the length of the carrier, it is not possible to lower the carrier to a position at which objects can be removed.

The present invention was created in an attempt to overcome the situation described above, and hence an object thereof is to provide a novel lift device and a vehicle equipped with the same, capable of suitably lowering objects placed in a high position to a lower position which can be reached by people.

SUMMARY OF THE INVENTION

In order to achieve the object of the present invention described above, one aspect of the present invention provides:
a vehicle equipped with a lift device for loading and unloading objects, the lift device comprising:
two link units disposed in parallel on the top of a vehicle with a predetermined gap therebetween and a drive source for operating both link units, each link unit comprising:
a first telescoping arm and a second telescoping arm, which are disposed parallel to each other in an upright posture on the top of the vehicle, the first telescoping arm and the second telescoping arm each comprising a base arm member of a predetermined length and a slide arm member, which is mobile in the lengthwise direction of the base arm member;
a base link which connects the first telescoping arm and the second telescoping arm to each other;
a support link, which is parallel to the base link, and which connects the slide arm members of the first telescoping arm and the second telescoping arm to each other;
a drive boom, which is swung up and down on the top of the vehicle around a drive shaft that is rotationally driven by the drive source;
a follow boom, which is swung in the same direction as the drive boom, around a support shaft that is parallel to the drive shaft around which the drive boom swings, one of the ends of the drive booms in the link units being coupled to the drive shaft, the base arm member on the first telescoping arm being attached to the leading end of the drive boom, and the base arm member on the second telescoping arm being attached to the leading end of the follow boom,
wherein the support link constitutes a horizontal support member for supporting the weight of an object that is to be loaded and unloaded, while being maintained parallel with the base link, the first telescoping arm and the second telescoping arm being swung between a standby position within the area of the top of the vehicle and a deployed position outside the area of the top of the vehicle by the swing movement of the drive boom, so as to be vertically inverted while being maintained parallel to each other, and in the deployed position, the slide arm members of the first telescoping arm and the second telescoping arm being acted upon by gravity so as to extend in a downward movement from the base arm members.

In another aspect of the present invention, a lift device is provided comprising two link units disposed in parallel on a high surface with a predetermined gap therebetween and a drive source for operating both link units, each of the link units comprising:
a first telescoping arm and a second telescoping arm, which are disposed parallel to each other in an upright posture on a high surface, and which comprise a base arm member of a predetermined length and a slide arm member, which is mobile in the lengthwise direction of the base arm member;
a base link which connects the first telescoping arm and the second telescoping arm to each other;

a support link, which is parallel to this base link, and which connects the slide arm members of the first telescoping arm and the second telescoping arm to each other;

a drive boom, which is swung up and down on the high surface around a drive shaft that is rotationally driven by the drive source;

a follow boom, which is swung in the same direction as the drive boom, around a support shaft that is parallel to the drive shaft around which the drive boom swings, wherein one of the ends of the drive booms in the link units is coupled to the drive shaft, the base arm member on the first telescoping arm is attached to the leading end of the drive boom, the base arm member on the second telescoping arm being attached to the leading end of the follow boom, the support link constituting a horizontal support member for supporting the weight of an object that is to be loaded and unloaded, while being maintained parallel with the base link, the first telescoping arm and the second telescoping arm being swung between a standby position within the area of the high surface and a deployed position outside the area of the high surface by the swinging movement of the drive boom, so as to be vertically inverted while being maintained parallel to each other, and in the deployed position, and the slide arm members of the first telescoping arm and the second telescoping arm being acted upon by gravity so as to extend in a downward movement from the base arm members.

Another aspect of the present invention is a lift device having the constitution described above, wherein at least one of the first telescoping arm or the second telescoping arm is provided with a slowing fluid-pressure cylinder for moderating the telescoping speed of the arms.

Furthermore, the fluid-pressure cylinder is a double acting cylinder comprising input and output ports for working fluid at the head and bottom thereof, a cylinder member of this fluid-pressure cylinder being attached to the base arm member, a telescoping rod member of this fluid-pressure cylinder being connected to the slide arm member, and a flow regulating valve being provided in a conduit line that connects the ports at the head and the bottom.

In a further aspect, the present invention comprises a swingable locking arm that is mounted on the base link, the leading end of this locking arm being provided with a catch for engaging at a point on the support link or a point on the slide arm member of the second telescopic arm, during the swinging movement of the first telescoping arm and the second telescoping arm from the standby position on the high surface to a predetermined angular position.

Another aspect of the invention is a lift device wherein a carrying frame for receiving an object is provided across the support links of the facing link units.

By virtue of the lift device according to the present invention, it is possible to suitably lower an object, which is supported by the support link that connects the pair of slide arm members, from a high surface to a predetermined position, by swinging the first telescoping arm and the second telescoping arm between a standby position within the area of a high surface, such as the top of a vehicle, and a deployed position outside the area of the high surface by the swinging movement of the drive boom, so as to be vertically inverted while being maintained parallel to each other, and in the deployed position, the slide arm members of the first telescoping arm and the second telescoping arm being acted upon by gravity so as to extend in a downward movement from the base arm members, so as to reduce the radius of swing of the drive boom and the follow boom.

In addition, at least one of the first telescoping arm or the second telescoping arm is provided with a slowing fluid-pressure cylinder for moderating the telescoping speed of the arms, whereby it is possible to safely raise and lower objects without the objects descending rapidly.

Moreover, the fluid-pressure cylinder is a double acting cylinder wherein a flow regulating valve is provided in a conduit line that connects ports at the head and the bottom, allowing the telescoping speed of the fluid-pressure cylinder to be controlled without complex circuits.

Furthermore, a swingable locking arm is mounted on the base link, and the leading end of this locking arm is provided with a catch for engaging at a point on the support link or a point on the slide arm member of the second telescopic arm, during the swinging movement of the first telescoping arm and the second telescoping arm from the standby position on the high surface to a predetermined angular position, whereby when an object is lowered from the high surface, even if force acts on the second telescoping arm, which is on the follow boom side, so as to elongate the second telescoping arm, the locking arm resists this force and prevents the link unit from being immobilized.

Furthermore, two link units are provided in parallel, and a carrying frame for receiving objects is provided across facing support links on these link units, whereby even large objects can be loaded on the carrying frame and raised and lowered.

DETAILED DESCRIPTION OF THE INVENTION

Figure 1:
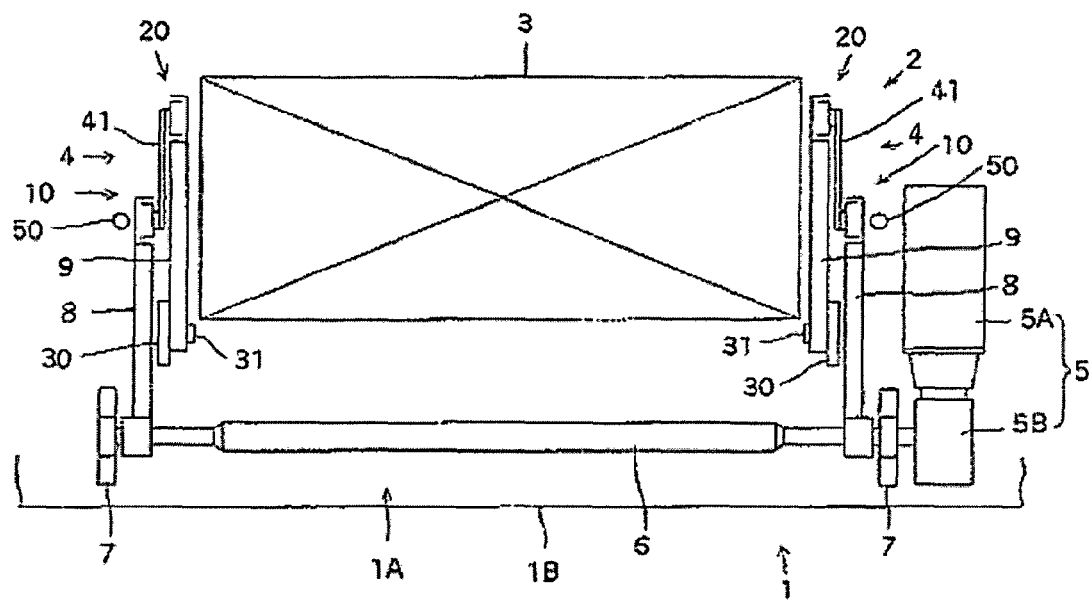
FIG. 1 is partial plane view illustrating a vehicle equipped with a lift device according to the present invention.

Hereinafter, the present invention will be described in further detail with reference to the drawings. FIG. 1 is a partial plane view illustrating a vehicle (and particularly a firefighting vehicle) provided with a lift device according to the present invention. In FIG. 1, reference numeral 1 indicates a box shaped vehicle, equipped with a lift device 2 on the top 1A thereof, for loading and unloading objects from one of the lateral faces 1B of the vehicle.

The lift device 2 comprises a pair of front and back link units 4, 4, which are disposed parallel to each other with a predetermined space therebetween, on either side of a carrying frame 3, in the front-back direction, on the top 1A of the vehicle, which is the high surface, and a single drive source 5 for driving these link units 4, 4. The drive source 5 comprises a reversible drive motor 5A, which is disposed adjacent to one of the link units 4, and a reducer 5B for increasing the rotational torque thereof. Note that the motor 5A can be started and stopped remotely from the ground by way of a control switch, provided at the rear of the vehicle 1 or the like, which is not shown in the drawing. Furthermore, a container (not shown), the top and side faces of which open and close, can be fitted in the carrying frame 3, this container being capable of containing various objects (firefighting equipment).

A drive shaft 6 is rotationally driven forward, and in reverse, by the drive source 5. One end of this drive shaft 6 is connected to the drive source 5 (reducer 5B), and both ends of this drive shaft 6 are rotatably supported by bearing units 7.

The link unit 4 is a linkage structure comprising: firstly, a drive boom 8, which is swung up and down on the top 1A of the vehicle around the drive shaft 6; a follow boom 9, which swings in the same direction as the drive boom 8 in response to the movement of this drive boom; a first telescoping arm 10, which is provided at the leading end of the drive boom 8; and a second telescoping arm 20 which is provided at the leading end of the follow boom 9. One end of this drive boom 8 is fixed on the drive shaft 6 and swings up and down around the drive shaft 6.

Note that, in FIG. 1, reference numeral 30 indicates a bracket that is fixed on the top of the vehicle, and a support shaft 31 is rotatably supported in this bracket 30 so as to constitute the center of swing of the follow boom 9, the support shaft 31 being parallel to the drive shaft 6.

Next, the structure of the link units 4 will be described in more detail. Note that the two link units 4 have the same structures, and therefore in FIG. 2 through FIG. 4, only one link unit is shown, and the structure of that one link unit is described.

Figure 2:
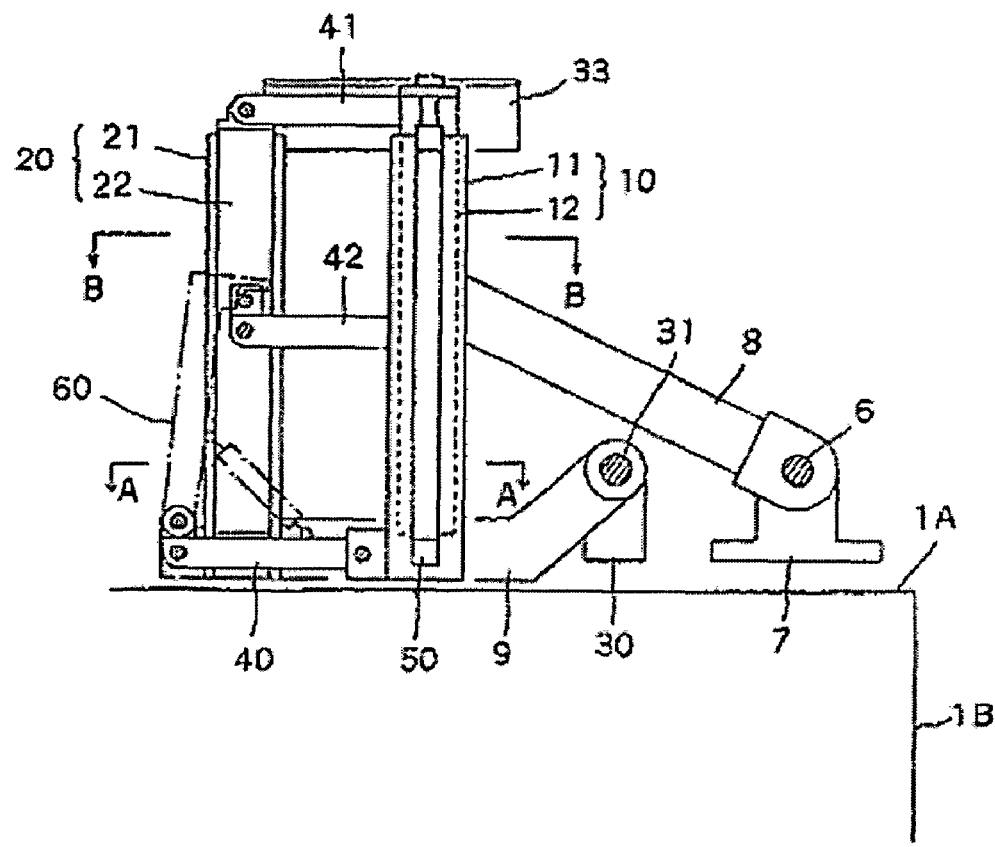
FIG. 2 is a front view of a link unit, which is a component of the lift device.
Figure 3:
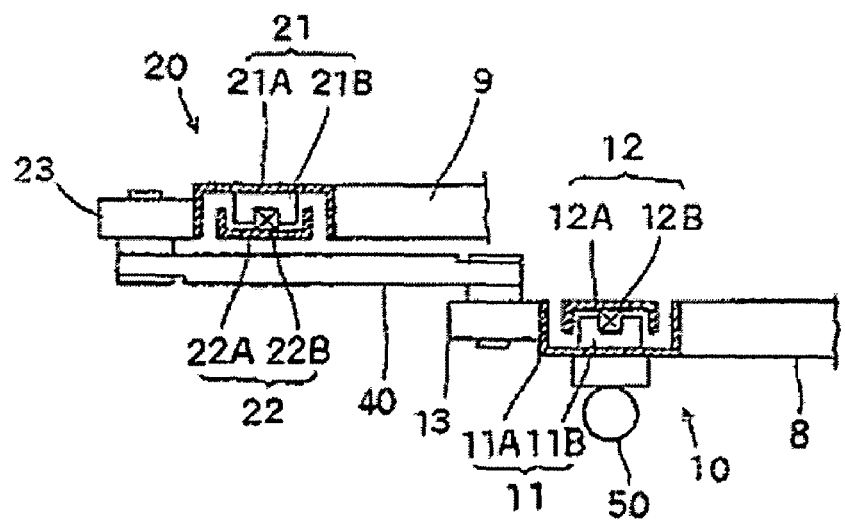
FIG. 3 is a sectional view according to A-A in FIG. 2.
Figure 4:
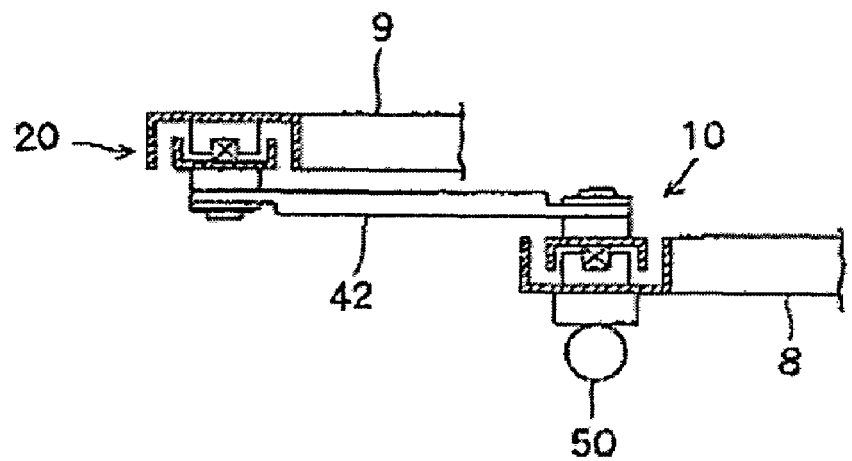
FIG. 4 is a sectional view according to B-B in FIG. 2.

Here, FIG. 2 is a front view illustrating one of the link units, and FIG. 3 and FIG. 4 are sectional views according to A-A and B-B in FIG. 2.

As can be understood from FIG. 2, the first telescoping arm 10 and the second telescoping arm 20 are disposed on the top 1A of the vehicle, parallel to each other and in an upright posture when in the standby position. Notably, in this example, the first telescoping arm 10 is mounted on the side of the lateral face 1B of the vehicle, and the second telescoping arm 20 is mounted at a position that is further from the lateral face 1B of the vehicle than the first telescoping arm 10. The first telescoping arm 10 and the second telescoping arm 20 comprise, respectively, base arm members 11, 21 of predetermined lengths, and slide arm members 12, 22, which can be displaced in the lengthwise direction of the base arm members 11, 21.

As can be understood from FIG. 3 and FIG. 4, the base arm members 11, 21 comprise linear guide blocks 11B, 21B, which are fixed in place along sectional U-shaped base arm main bodies 11A, 21A, which are made from channel steel or the like, while slide arm members 12, 22 comprise mobile rails 12B, 22B, which are fixed in place along sectional U-shaped slide arm main bodies 12A, 22A.

Then, the base arm main body 11A of the base arm member 11, which is comprised of the first telescoping arm, is attached to the leading end of the drive boom 8, the base arm main body 21A of the base arm member 21, which is comprised of the second telescoping arm, is attached to the leading end of the follow boom 9, and the mobile rails 12B, 22B, which are comprised of the slide arm members 12, 22, are slidably engaged in the linear guide blocks 11B, 21B, which are comprised by the base arm members 11, 21.

Furthermore, brackets 13, 23 are fixed in place at the bottoms of the base arm main bodies 11A, 21A, which are comprised of the base arm members 11, 21, and the base arm members 11, 21 are connected to each other by a base link 40, where these brackets 13, 22 are located. Meanwhile, the leading ends and the intermediate members of the slide arm members 12, 22 are connected by support links 41, 42 respectively. Specifically, the base link 40 and the support links 41, 42 constitute parallel links, which are parallel to each other, and each have a length equal to the distance separating the points at which the drive boom 8 and the follow boom 9, are supported (the distance between the centers of the drive shaft 6 and the support shaft 31).

Thus, if the drive boom 8 swings up and down around the drive shaft 6, the follow boom 9 swings in the same direction as the drive boom 8 by intermediary of the first telescoping arm 10, the base link 40, the support links 41, 42 and the second telescoping arm 20; and the first telescoping arm 10 and the second telescoping arm 20 can telescope while swinging so as to be maintained parallel to each other.

Note that, in FIG. 2 to FIG. 4, reference numeral 50 indicates a fluid-pressure cylinder (hydraulic cylinder) for moderating the telescoping speed of the first telescoping arm 10 and the second telescoping arm 20. In this example, this fluid-pressure cylinder 50 is mounted on the first telescoping arm 10, on the drive boom side.

Figure 5:
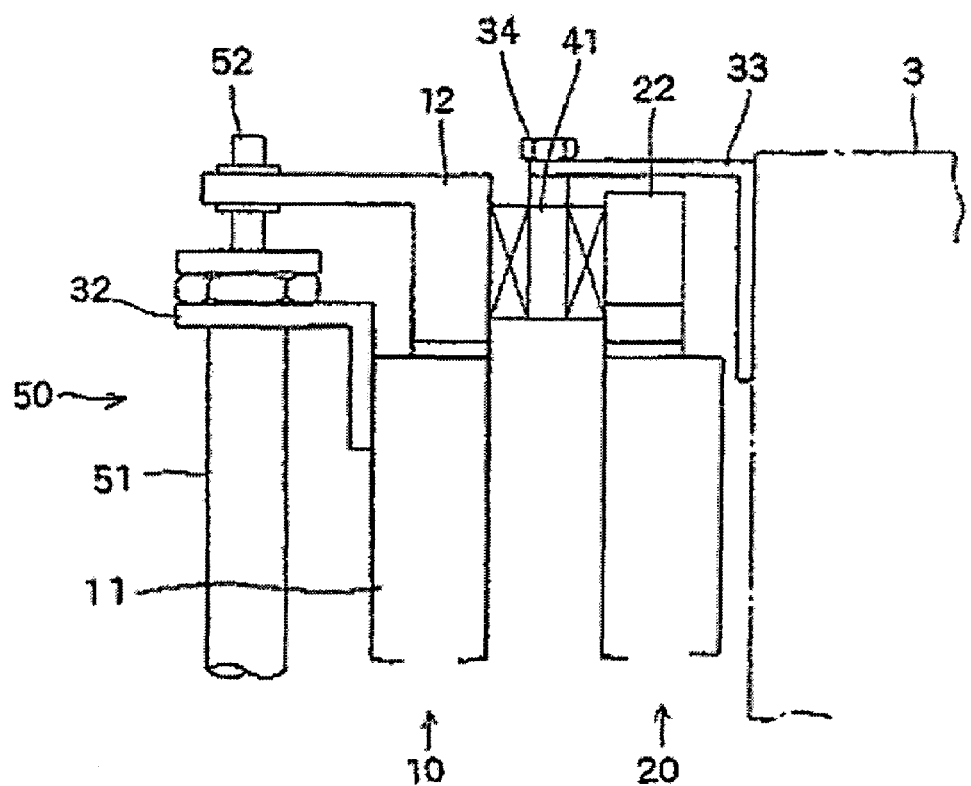
FIG. 5 is a partial enlarged view of the link unit.

As can be understood from FIG. 5, a cylinder member 51 (external body) of the fluid-pressure cylinder 50 is fixed in place by way of a bracket 32 on the base arm member 11, which is comprised of the first telescoping arm 10, and a telescoping rod member 52 of this fluid-pressure cylinder is connected to the leading end of the slide arm member 12.

Figure 6:
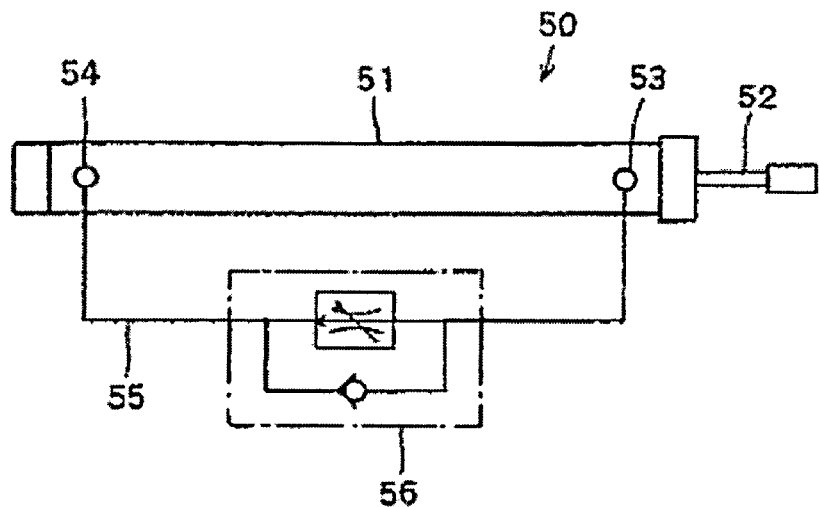
FIG. 6 is a schematic view of the fluid-pressure cylinder.

Specifically, as shown in FIG. 6, this is a double action hydraulic cylinder wherein input and output ports 53, 54 for working fluid (working oil) are provided at the head and the bottom of the cylinder member 51 of this fluid-pressure cylinder 50, and a flow regulating valve 56 with a check valve is provided on a conduit line 55 that connects these ports 53, 54 at the head and the bottom. Then, the extent to which the telescoping speed of the first telescoping arm 10 is moderated is controlled by way of this flow regulating valve 56.

Note that the flow regulating valve 56 in FIG. 6 cannot control the speed of contraction of the first telescoping arm 10, but the speed of contraction can be moderated by the resistance within the conduit line 55. Furthermore, this fluid-pressure cylinder 50 is not limited to being mounted on the first telescoping arm 10, but may be mounted on the second telescoping arm 20. Or, it may be mounted on the first telescoping arm 10 and the second telescoping arm 20. But, only by mounting it on either one of the first telescoping arm 10 or the second telescoping arm 20, the telescoping speed of not just one of these, but rather both of these, are moderated simultaneously.

Furthermore, as can be understood from FIG. 5, the carrying frame 3 is fixed in place on the support link 41 (top link) that connects the leading ends of the slide arm members 12, 22 by way of an L-shaped connecting mount 33, so as to constitute a horizontal support member that supports the weight (in the present embodiment, the combined total weight of the carrying frame 3, the container that is loaded thereon, and the contents of this container) of the objects that are to be raised and lowered. Note that, in FIG. 5, reference numeral 34 indicates a bolt that is screwed into the support link 41 from the connecting mount 33 that is to be fixed in place on the support link 41. Here, the structure that supports the object on the support link 41 may be such that a beam member bridges the support links 41, 41 of the pair of link units 4, 4k, and the object is bound onto this beam member with a belt or the like, or the object is suspended from this beam member by a wire rope.

Figure 7:
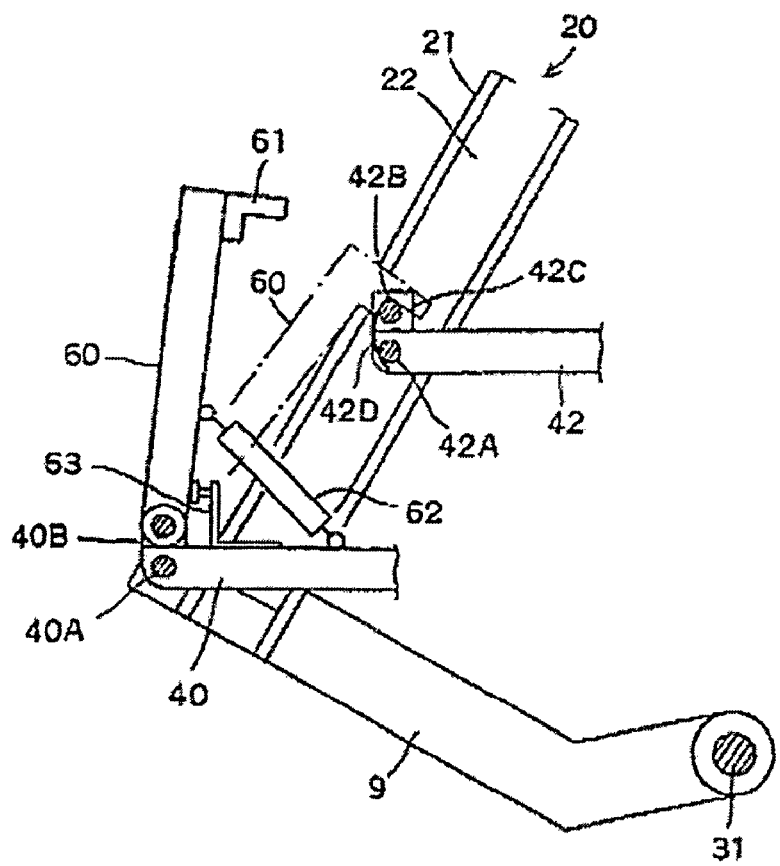
FIG. 7 is a schematic view illustrating an example of a locking arm device.

Meanwhile, in FIG. 7, a locking arm 60 is swingably mounted on the base link 40. This locking arm 60 serves to prevent the link unit 4 from being immobilized as a result of eccentric loading of the object that is to be loaded and unloaded. And, in the present embodiment, this locking arm 60 is swingably mounted on the second telescoping arm 20 side of the base link 40. Furthermore, a locking pin 42B is provided next to a connector pin 42A for connecting the second telescoping arm 20 to the support link 42 (intermediate link) that connects the middle sections of slide arm members 12, 22 to each other.

Here, a protrusion 40B is formed next to the connecting pin 40A that connects the second telescoping arm 20 to the base link 40, one end of the locking arm 60 is pivotably mounted on this protrusion 40B, and a catch 61 is provided on the leading end of the locking arm 60 for engaging with a locking pin 42B. Furthermore, an elastic member 62 (tensioning spring) is engaged between the base link 40 and the locking arm 60 so as to bias the catch 61 in the direction of the locking pin 42B. As a result of this elastic force, the catch 61 of the locking arm 60 and the locking pin 42B are maintained engaged when the first telescoping arm 10 and the second telescoping arm 20 are in the standby position on the top 1A of the vehicle (the position illustrated in FIG. 2).

While the first telescoping arm 10 and the second telescoping arm 20 swing so as to move from the standby position on the top 1A of the vehicle to a predetermined angular position (in this example, inclination of 30° from the position at which the first telescoping arm 10 and the second telescoping arm 20 are orthogonal to the top 1A of the vehicle), the telescoping action of the second telescoping arm 20 is limited as a result of the engagement of the catch 61 with the locking pin 42B. But, if the first telescoping arm 10 and the second telescoping arm 20 go beyond the predetermined angular position, as a result of the change in the angle of intersection between the base link 40 and second telescoping arm 20, the catch 61 of the locking arm 60 is separated from the locking pin 42B, which allows the second telescoping arm 20 to telescope, as shown in FIG. 7.

Note that, in FIG. 7, reference numeral 63 indicates a stopper that is mounted on the base link 40 adjacent to the locking arm 60. This stopper 63 holds the locking arm 60 when the catch 61 disengages from the locking pin 42B, so as to prevent the locking arm 60 from wobbling. Furthermore, as shown in FIG. 7, an arcuate guide plate 42D is provided between the connector pin 42A and the locking pin 42B on the support link 42. When the first telescoping arm 10 and the second telescoping arm 20 return to the standby position, the locking arm 60 is swung counterclockwise, according to FIG. 7, by this guide plate 42D so that the catch 61 is reliably engaged with the locking pin 42B.

Next, the operation of a lift device having a constitution such as described above is described with reference to FIG. 8(A)-(D). FIG. 8(A) illustrates the situation when the first telescoping arm 10 and the second telescoping arm 20 are disposed in an upright posture on the top 1A of the vehicle, in the standby position. At this time, the carrying frame 3 is supported by the top 1A of the vehicle.

In this state, if the drive source 5 is driven so that the drive boom 8 is swung clockwise, as shown in FIG. 8(B), the first telescoping arm 10 that is provided at the leading end of the drive boom swings in the direction of the deployed position (toward the lateral face 1B of the vehicle, where the objects are loaded and unloaded) which is outside the area of the top 1A of the vehicle, while the second telescoping arm 20, which is connected to the first telescoping arm 10 by way of the base link 40 and the support links 41, 42, swings towards the deployed position in parallel with the first telescoping arm 10, while the bottom end of the base arm member 21 is supported by the follow boom 9.

Here, the carrier frame 3 has a shape that protrudes further in the direction of the first telescoping arm 10 than it does in the direction of the second telescoping arm 20 on the top 1A of the vehicle, so that large objects can be loaded and unloaded. Therefore, in the situation shown in FIG. 8(B), if a clockwise moment acts on the support link 41 as a result of eccentric loading, and as a result a force acts on the slide arm member 22 of the second telescoping arm 20 so as to elongate slide arm member 22 and deform the parallelogram that is created by the first telescoping arm 10, the second telescoping arm 20, the base link 40 and the support links 41, 42, there is a risk of the link unit 4 becoming immobilized, as a result of the great lateral pressure that is exerted on the base arm member 21 by the slide arm member 22.

Consequently, in the present embodiment, during the travel of the first telescoping arm 10 and the second telescoping arm 20 from the standby position, up to the point at which the predetermined angular position is reached, the locking arm 60 shown in FIG. 7 and elsewhere serves to limit the telescoping action of the second telescoping arm 20, whereby even if the center of balance of the objects to be loaded and unloaded is eccentric with respect to the first telescoping arm 10, the link unit 4 will be able to operate properly.

Thus, the first telescoping arm 10 and the second telescoping arm 20 are swung to the deployed position while being maintained parallel to each other, and are first vertically inverted, as shown in FIG. 8(C) upon passing through the horizontal. But, the base link 40 and the support links 41, 42 are maintained horizontal, whereby the carrying frame 3 that is supported by the support link 41 is maintained horizontal without being vertically inverted, and is moved outside the area of the top 1A of the vehicle.

Figure 8:
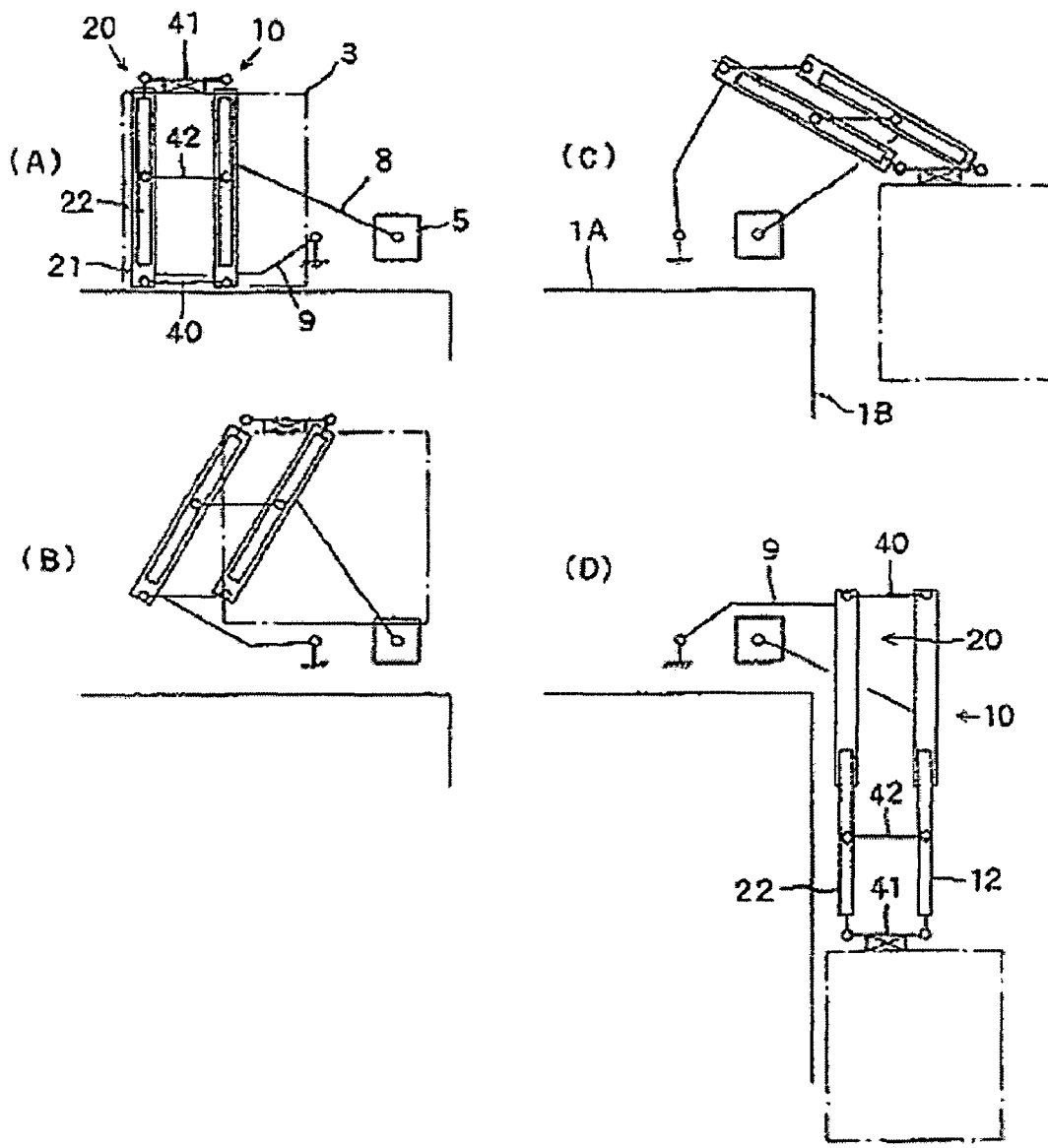
FIG. 8(A) is a side view illustrating the operation of the link unit when the first telescoping arm and the second telescoping arm are disposed in an upright posture on the top of the vehicle, in the standby position.
FIG. 8(B) is a side view illustrating the operation of the link unit when the drive source is driven so that the drive boom 8 is swung clockwise, such the first telescoping arm that is provided at the leading end of the drive boom swings in the direction of the deployed position (toward the lateral face of the vehicle, where the objects are loaded and unloaded) which is outside the area of the top of the vehicle, while the second telescoping arm, which is connected to the first telescoping arm by way of the base link and the support links swings towards the deployed position in parallel with the first telescoping arm, while the bottom end of the base arm member is supported by the follow boom.
FIG. 8(c) is a side view illustrating the operation of the link unit when the first telescoping arm and the second telescoping arm are swung to the deployed position while being maintained parallel to each other, and are first vertically inverted, upon passing through the horizontal.
FIG. 8(D) is a side view illustrating the operation of the link unit when the first telescoping arm and the second telescoping arm have reached the deployed position and are completely vertically inverted (i.e., in an inverted state)

FIG. 8(D) illustrates the situation when the first telescoping arm 10 and the second telescoping arm 20 have reached the deployed position and are completely vertically inverted (inverted state). In this state, the slide arm members 12, 22 of the first telescoping arm 10 and the second telescoping arm 20 are extended in a downward motion from the base arm members 11, 21. But, the telescoping speed is moderated by the fluid-pressure cylinder 50 that is shown in FIG. 2, so that the carrying frame 3 is gradually lowered along the lateral face 1B of the vehicle. Then, the carrying frame 3 is stopped at approximately 1 m above the ground, and, at this time, the lateral face (the right hand face in FIG. 8) of container that is loaded on the carrying frame 3, which is not illustrated, is opened and the contents are taken out from the interior.

Meanwhile, when the carrying frame 3 is to be loaded on to the top 1A of the vehicle, it suffices that the drive boom 8 be swung in the direction opposite to that described above. Note that, in FIG. 8(D), the first telescoping arm 10 and second telescoping arm 20 are shown as extended in the vertical direction. But, in actuality, the position of the follow boom 9 is detected by a detector (limit switch), which is not illustrated but which is provided on the top 1A of the vehicle, and the drive source 5 is stopped immediately before the first telescoping arm 10 and second telescoping arm 20 reach the vertical state, whereby the first telescoping arm 10, the second telescoping arm 20, the base link 40 and support link 41 form a parallelogram that is slightly skewed to the left in FIG. 8(D).

Accordingly, when the first telescoping arm 10 and second telescoping arm 20 are in the deployed position, and the drive boom 8 is swung counterclockwise, according to FIG. 8(A)-(D), it is possible to swing the first telescoping arm 10 and the second telescoping arm 20 without the link unit 4 becoming immobilized, so that the carrying frame 3 can be disposed in the predetermined position on the top 1A of the vehicle.

Note that, when the first telescoping arm 10 and the second telescoping arm 20 return from the deployed position to the standby position, the telescoping arms 10, 20 are swung in the extended state and are vertically inverted above the top 1A of the vehicle, whereupon gravity acts upon the slide arm members 12, 22 that are extended upwards from the base arm members 11, 21, so that these move downwards and slide into the base arm members 11, 21. At this time, as shown in FIG. 7, after the locking arm 60 is swung in the direction of separation from the locking pin 42B against the biasing force of the elastic member 62, this locking arm 60 is pulled back towards the locking pin 42B by the elastic member 62, so that the catch 61 of the locking arm is engaged on the locking pin 42B.

In the foregoing, one embodiment of the present invention has been described, but the present invention is not limited to the embodiment described above. For example, in addition to firefighting vehicles, the present invention can be applied to trucks or freight cars. Furthermore, in addition to installing such a lift device 2 on the top 1A of a vehicle, the present invention provides a lift device for placing objects to be stored on, and removing stored objects from, high surfaces such as shelves and the roofs of houses.

Furthermore, the present invention is not limited to providing two link units 4 in parallel. Rather, the invention may comprise a single link unit 4 with a structure wherein the weight of the object is supported by a single support link 41 or support arm 42.

In addition, in the example described above, the locking pin 42B is provided at one end of the support link 42 as a point of engagement for the catch 61 of the locking arm, but the catch 61 may engage at a point on the support link 41 or the second telescoping arm 20. Note that the locking arm 60 may be omitted by way of contrivance in terms of positioning the object to be raised and lowered.

The invention claimed is:

1. A vehicle equipped with a lift device for loading and unloading objects, said lift device comprising:
    two link units disposed in parallel on the top of the vehicle with a predetermined gap therebetween, and
    a drive source for operating both link units,
    each of said link units comprising:
    a first telescoping arm and a second telescoping arm, which are disposed parallel to each other in an upright posture on the top of the vehicle, and each of which comprise a base arm member of a predetermined length and a slide arm member, which is mobile in the lengthwise direction of said base arm member;
    a base link which connects the first telescoping arm and the second telescoping arm to each other;
    a support link, disposed parallel to the base link, which connects the slide arm members of the first telescoping arm and the second telescoping arm to each other;
    a drive boom, which is swung up and down on the top of the vehicle around a drive shaft, that is rotationally driven by said drive source; and
    a follow boom, which is swung, in the same direction as said drive boom, around a support shaft that is parallel to said drive shaft around which the drive boom swings,
    wherein one of the ends of the drive booms in these link units being coupled to the drive shaft, the base arm member on said first telescoping arm being attached to the leading end of said drive boom, the base arm member on said second telescoping arm being attached to the leading end of said follow boom, said support link constituting a horizontal support member for supporting the weight of an object that is to be loaded and unloaded, while being maintained parallel with said base link, and
    wherein said first telescoping arm and said second telescoping arm being swung between a standby position within the area of the top of the vehicle and a deployed position outside the area of the top of the vehicle by the swing movement of said drive boom, so as to be vertically inverted while being maintained parallel to each other, and in said deployed position, the slide arm members of the first telescoping arm and the second telescoping arm being acted upon by gravity so as to extend in a downward movement from the base arm members.

2. A lift device comprising:
    two link units disposed in parallel on a high surface with a predetermined gap therebetween, and
    a drive source for operating both link units,
    each of said link units comprising:
    a first telescoping arm and a second telescoping arm, which are disposed parallel to each other in an upright posture on a high surface, and each of which comprise a base arm member of a predetermined length and a slide arm member, which is mobile in the lengthwise direction of said base arm member;
    a base link which connects the first telescoping arm and the second telescoping arm to each other;
    a support link, which is parallel to the base link, and which connects the slide arm members of the first telescoping arm and the second telescoping arm to each other;
    a drive boom, which is swung up and down on the high surface around a drive shaft that is rotationally driven by said drive source; and
    a follow boom, which is swung, in the same direction as said drive boom, around a support shaft that is parallel to said drive shaft around which the drive boom swings,
    wherein one of the ends of the drive booms in these link units is coupled to the drive shaft, the base arm member on said first telescoping arm being attached to the leading end of said drive boom, and the base arm member on said second telescoping arm being attached to the leading end of said follow boom, and
    wherein said support link constitutes a horizontal support member for supporting the weight of an object that is to be loaded and unloaded, while being maintained parallel with said base link, said first telescoping arm and said second telescoping arm being swung between a standby position within the area of the high surface and a deployed position outside the area of the high surface by the swinging movement of said drive boom, so as to be vertically inverted while being maintained parallel to each other, and in said deployed position, the slide arm members of the first telescoping arm and the second telescoping arm being acted upon by gravity so as to extend in a downward movement from the base arm members.

3. The lift device of claim 2, wherein at least one of the first telescoping arm or the second telescoping arm is provided with a slowing fluid-pressure cylinder for moderating the telescoping speed of the arms.

4. The lift device of claim 3, wherein the fluid-pressure cylinder is a double acting cylinder comprising input and output ports for working fluid at the head and bottom thereof, a cylinder member of said fluid-pressure cylinder being attached to the base arm member, a telescoping rod member of said fluid-pressure cylinder being connected to the slide arm member, and a flow regulating valve being provided in a conduit line that connects the ports at the head and the bottom.

5. The lift device recited in claim 2, further comprising:
a swingable locking arm that is mounted on the base link, the leading end of said locking arm having a catch for engaging at a point on the support link or a point on the slide arm member of the second telescopic arm, during the swinging movement of the first telescoping arm and the second telescoping arm from the standby position on the high surface to a predetermined angular position.

6. The lift device recited in claim 2, wherein a carrying frame for receiving an object is provided across the support links of the facing link units.

7. The lift device recited in claim 3, further comprising:
a swingable locking arm that is mounted on the base link, the leading end of said locking arm having a catch for engaging at a point on the support link or a point on the slide arm member of the second telescopic arm, during the swinging movement of the first telescoping arm and the second telescoping arm from the standby position on the high surface to a predetermined angular position.

8. The lift device recited in claim 4, further comprising:
a swingable locking arm that is mounted on the base link, the leading end of said locking arm having a catch for engaging at a point on the support link or a point on the slide arm member of the second telescopic arm, during the swinging movement of the first telescoping arm and the second telescoping arm from the standby position on the high surface to a predetermined angular position.

9. The lift device recited in claim 3, wherein a carrying frame for receiving an object is provided across the support links of the facing link units.

10. The lift device recited in claim 4, wherein a carrying frame for receiving an object is provided across the support links of the facing link units.

11. The lift device recited in claim 5, wherein a carrying frame for receiving an object is provided across the support links of the facing link units.

\* \* \* \* \*